United States Patent [19]

Copeland

[11] Patent Number: 5,138,893
[45] Date of Patent: Aug. 18, 1992

[54] BICYCLE HANDLEBAR HANDGRIP ADAPTER SYSTEM

[76] Inventor: Victor Copeland, P.O. Box 1926, Rancho Santa Fe, Calif. 92067

[21] Appl. No.: 712,576

[22] Filed: Jun. 10, 1991

[51] Int. Cl.$^5$ .............................................. B62K 21/12
[52] U.S. Cl. ................................... 74/551.1; 74/551.8
[58] Field of Search ................ 74/551.1, 551.3, 551.4, 74/551.6, 551.7, 551.8

[56] References Cited

U.S. PATENT DOCUMENTS

| | | | |
|---|---|---|---|
| 556,398 | 3/1896 | Blood et al. | 74/551.4 |
| 586,897 | 7/1897 | Godfrey | 74/551.3 |
| 603,995 | 5/1898 | Powell | 74/551.4 |
| 2,180,617 | 11/1939 | Snell | 74/551.1 |
| 3,385,615 | 5/1968 | Hussey | 74/551.6 X |
| 3,942,822 | 3/1976 | Lewis | 74/551.3 |
| 4,417,745 | 11/1983 | Shomo | 74/551.3 |
| 4,493,225 | 1/1985 | Galahad | 74/551.3 |
| 4,750,754 | 6/1988 | Lennon | 74/551.8 |
| 5,033,325 | 7/1991 | Giard, Jr. | 74/551.3 |

FOREIGN PATENT DOCUMENTS 601729 8/1934 Fed. Rep. of Germany ..... 74/551.3

Primary Examiner—Leslie A. Braun
Assistant Examiner—Winnie Yip
Attorney, Agent, or Firm—Frank D. Gilliam

[57] ABSTRACT

An improved handgrip adapter system for a bicycle which provides closely spaced handgrips positioned below and in front the a normal bicycle handlebar crosspiece. The handgrips comprise a pair of tubular members having clamps at one end adapted to be clamped to the crosspiece of normal bicycle handlebars. The tubes extend forward and downward from the crosspiece, curving down and back to provide a comfortable gripping surface for a rider. The handgrips may be positioned a suitable distance apart, selected in accordance with the size and preference of the rider, with the handgrips preferably positioned so that the hands low and are relatively close together, so that the rider's hands and arms are within the horizontal chest dimension. The handgrips extend further to the front than the handlebar handgrips, so that the rider's back is substantially horizontal. The handgrips extend slightly toward each other to acccommodate the rider's arms angling in from the shoulders for maximum riding comfort. These handgrips leave the normal handlebars fully usable where maximum riding speed is not desired. These handgrips comply with present United States Cycling Federation regulations for use in certified mass start racing events.

12 Claims, 1 Drawing Sheet

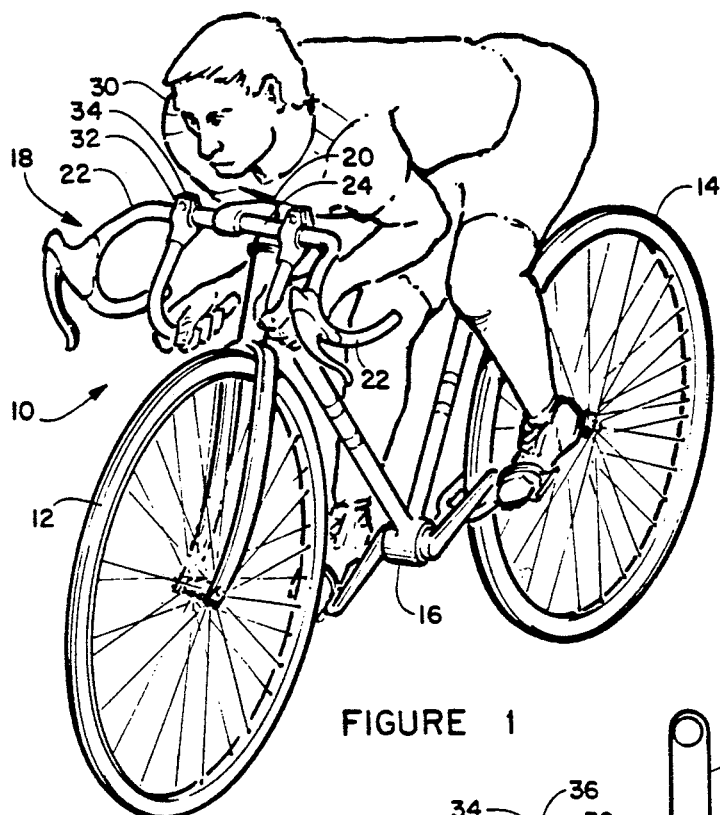
FIGURE 1
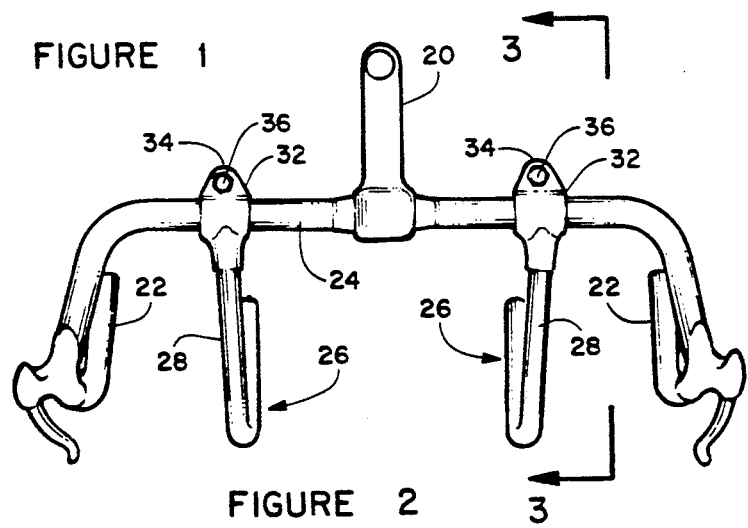
FIGURE 2
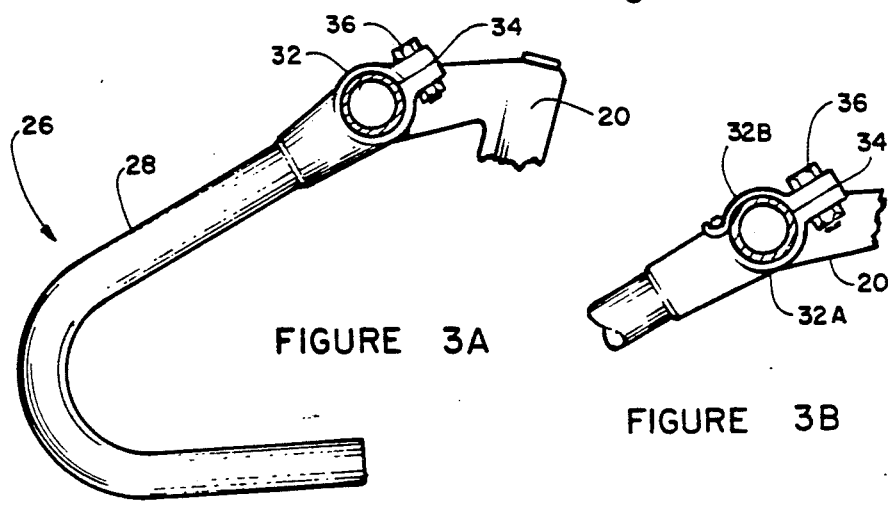
FIGURE 3A
FIGURE 3B

BICYCLE HANDLEBAR HANDGRIP ADAPTER SYSTEM

BACKGROUND OF THE INVENTION

This invention relates in general to bicycles and, more specifically, to improved handgrips particularly adapted to use on racing bicycles.

Bicycling has long been a recreational activity in which a great many people participate. While many riders prefer leisurely riding, other participate in long distance riding or racing in which maximum speed with lowest energy expenditure is important. A great many improvements have been made in bicycles and a variety of accessories have been developed to meet the needs of these enthusiasts. For example, a number of improvements have been made in handlebar design in attempt to achieve an optimum combination of power, endurance, low wind resistance, comfort and speed.

Most racing bicycles use one basic handlebar design, that having a substantially straight transverse crossbar attached to the front wheel stem and two handgrips at the ends of the crossbar curving to the front, down and back. A number of modifications to this handlebar design have been made, with little performance improvement. Typically, as disclosed by Lennon in U.S. Pat. Nos. 4,750,754 and 4,878,397, extensions may be provided on the normal handgrips which come together to form extended handgrips above and in front of the handlebar crosspiece. The rider grips the extensions while resting his forearms on the crosspiece. This causes the rider to extend his hands further to the front but provides hand grips that are even higher than the handlebar modification does not, however, sufficiently lower the rider's back to the horizontal position I have found to be desirable. Note, for example, the rider's back position shown in FIG. 3 of the 4,750,754 Pat. No. Also, the crossbar adversely restricts downward movement of the rider's arms as changing conditions may require. Further, this arrangement is not presently allowed in United States Cycling Federation rules for mass start races.

These and other prior handlebar designs do not provide for lowest wind resistance and the optimum hand position for best rider balance. Most designs are fixed in one position in the handlebar design and do not allow movement and adjustment of components to best fit riders of different sizes.

Thus, there is a continuing need for improvements in handlebars which are adaptable to a variety of bicycles with different basic handlebars, and which allow the rider to achieve the optimum combination of power, endurance, low wind resistance, comfort and speed required for long distance cycling or racing.

SUMMARY OF THE INVENTION

It is, therefore, an object of this invention to provide a bicycle handlebar adapter system which permits an optimum combination of rider balance and increased speed from low wind resistance. Another object is to provide such a system that is adaptable to a wide variety of handlebars and bicycles. A further object is to provide such a system that is adjustable for riders of different sizes. A still further object of this invention allows for quick access to standard break and shifting levers. Yet another object of this invention is to provide bicycle handle bars suitable for mass start races.

The above objects, and others, are accomplished in accordance with this invention without sacrificing any of the benefits of conventional bicycle handlebar by a bicycle handlebar adapter system which basically comprises a pair of second handgrips for use with a conventional handlebar assembly having a crosspiece fastened to the front wheel stem with a pair of first handgrips formed in the ends of the crosspiece. Each of the second handgrips comprises a tubular member having a clamp at one end adapted to open sufficiently to fit over the handlebar crosspiece without removal of pre-installed brake mechanisms, gripping tape or the like for easy installation and removal and secure the second to the handlebar crosspiece between the crosspiece attachment and the first handgrip, the second handgrip extending forward from the clamp, then bending in a curve downward and then rearward, forming a curve of sufficient size to be grasped by the rider's hand.

The second handgrips extend sufficiently far forward that a rider's back is substantially horizontal. Preferably, the second handgrips are sufficiently close together so that the hands and arms are within the rider's horizontal chest dimension. Optimally, each of the second handgrips lies in a substantially vertical plane, and those planes are slightly out of parallel so that those planes would meet the vertical centerline plane of the bicycle somewhat in front of the bicycle, for maximum comfort as the rider's unsupported arms angle in with the hands closer together that the shoulders.

BRIEF DESCRIPTION OF THE DRAWING

Details of the invention, and of preferred embodiments thereof, will be further understood upon reference to the drawing, wherein:

FIG. 1 is a schematic perspective view of a bicycle using the handgrip adapter system of this invention;

FIG. 2 is a plan view of the handlebar assembly;

FIG. 3A is a detail section view taken on line 3——3 in FIG. 2; and

FIG. 3B is a preferred embodiment of the handgrip adapter to handlebar assembly removable attachment means.

DETAILED DESCRIPTION OF PREFERRED EMBODIMENTS

Referring now to FIG. 1, there is seen a conventional bicycle 10, having a front wheel 12, a rear wheel 14 and a frame 16. Conventional handlebars 18 are mounted at the center on stem 20 connected to front wheel 12. Conventional first handgrips 22 are located at the ends of crosspiece 24 of handlebars 18. The second handgrip adapters 26 are secured to crosspiece 24 between stem 20 and first handgrips 22. A seat (not shown) supports a rider 30, shown using second handgrips 26 with his back substantially horizontal and his arms angled together.

Details of the second handgrip adapters 26 of this invention are detailed in FIGS. 2, 3A and 3B. Handgrips 26 are preferably formed from aluminum tubes 28, with a diameter preferably of from about three quarters to one inch. If desired, other material could be used for tubes 28 such as solid fiber reinforced plastics, plastic tubes filled with plastic foam,, etc.

The handgrips have clamps 32 at one end adapted to secure handgrips 26 to crosspiece 24. While any suitable clamping means may be used, the clamp 32 is adapted to open sufficiently to allow attachment to the handlebar 18 without the removal of brake cables, grip tape or the like. Generally, the clamp will be hinged or otherwise pivotal at one end surface, as shown in FIG. 3B, and clamped or secured at the other end surface by a bolt 36 which holds the clamp tight and secure or, as shown in FIG. 3A, a split clamp utilizing the bolt 36 to draw the clamp closed and tighten against the crosspiece. The embodiment of FIG. 3B is preferred for ease of installation over and around the brake cabling gripping tape and the like, selected position adjustment and the capability of securely maintaining the selected position during use. Alternative fastening means, such as adhesive bonding, set screws through tubes, etc. could be used if desired, although with less adaptability.

Second handgrips 26 are formed so that, once in place, the tubes 28 extend forwardly and slightly downwardly along an approximately straight line for a selected distance, then curve downwardly and then back, forming a uniform curve as shown. The curved portion should be sized to be easily gripped by the rider's hand. Generally, an approximately circular curve with an radius of from about three to four inches is suitable.

The distance tubes 28 extend forwardly, from crosspiece 24 to the furthest forward edge of the curved portion could be optimized for the particular bicycle, size of rider, etc. For most riders, a distance of from about five to eight inches gives excellent results, with the rider's back substantially horizontal while riding.

Second handgrips 26 may be spaced apart any suitable distance. In general, it is preferred that the handgrips be sufficiently close together so that the rider's unsupported arms angle inwardly sufficiently that the hands and arms are within the widest dimension of the rider's chest. While the position may be easily optimized for a particular rider's size, in general a spacing of from about four to eight inches gives excellent results. Much wider spacing will increase arm wind resistance and much narrower spacing will limit the steerability of the bicycle.

The second handgrips 26 are from six to ten inches below the handlebar crosspiece 24. In this position, the handgrips 26 provide a lower gripping position than standard or conventional handgrip position.

While a plane through a second handgrip 26 may be at any suitable angle to the ground, generally a substantially vertical plane gives good results. Preferably, these planes through the handgrips will be angled slightly toward the vertical plane through the bicycle centerline, intersecting that plane somewhat in front of the bicycle. Preferably the angle between the vertical plane of a second handgrip 26 and the vertical centerline plane of bicycle 10 will be from about ten to twenty-five °. This slight inward angle corresponds substantially to the angle of the rider's arms, from his shoulders to the narrower handgrip position, providing greater comfort in use.

If desired, the gripping area of handgrips 26 could be covered with conventional elastomeric tape or tubes for improved comfort. While a specific, most common, type of racing handlebar 18 configuration is shown, other handlebar shapes may be used, if desired. The second handgrips 26 as shown can be used with any handlebar configuration having a substantially straight crosspiece 24. If the crosspiece on other handlebars is not straight (typically in a shallow "V"), special handgrips 26 can be easily made with clamps 32 fastened to tubes 28 at a corresponding angle. As seen in FIG. 1, the original handgrips 22 can still be used with the second handgrips 26 in place. Thus, during recreational riding, a rider may alternate to change his body position for comfort, typically using the first handgrips 22 for low speed, level surface riding and using the second handgrips 26 to gain greater speed downhill.

Other applications, variations and ramifications of this invention will occur to those skilled in the art upon reading this disclosure. Those are intended to be included within the scope of this invention, as defined in the appended claims.

I claim:

1. In combination with a bicycle handlebar having a crosspiece with a first pair of handgrips formed at each distal end thereof said handlegrip extending in a first direction, said handlebar including a handle bar adapter system comprising:

a second pair of tubular handgrips being substantially U-shaped and having a first and second leg;

clamp means fixedly secured to a distal end of a first leg of each of said second handgrips, said clamps means being substantially a directional continuation of said first leg of each of said second handgrips and securing said second handgrips to said bicycle handlebar crosspiece, said clamp means being secured to said tubular handgrip in a manner such that said second handgrips on said bicycle handlebar crosspiece each lies in a plane and said planes are angled sufficiently to intersect a third plane orthogonally formed with an axis of said crosspiece and said third plane located between said pair of said tubular handgrips whereby the plane of said second handgrips intersect said third plane at a position outwardly of the base of the U-shaped handgrip opposite the direction from which said first and second legs extend; and said second handgrips being clamped to said crosspiece and extending in a substantially straight line forwardly of the cross piece, then curving downwardly below said crosspiece and rearwardly in the direction of said crosspiece.

2. The bicycle handlebar adapter system according to claim 1 wherein said second handgrips extend in a straight line slightly inward direction forward of the crosspiece and then downward in a slightly inward direction rearwardly.

3. The bicycle handlebar adapter system according to claim 1 wherein space between second handgrips is from about four to eight inches.

4. The bicycle handlebar adapter system according to claim 1 wherein said curved portion extends about five to eight inches beyond said clamp.

5. The bicycle handlebar adapter system according to claim 1 wherein said clamps means opens sufficiently to allow attachment of said handlebar system on said handlebar crosspiece and include bolts to close said clamp means into clamping contact with said handlebars.

6. The bicycle handlebar adapter system according to claim 1 wherein said clamps open sufficiently to allow attachment of said handlebar system on said handlebar crosspiece and include bolts to close said clamps and bring said sleeves into clamping contact with said handlebars.

7. In a handlebar assembly for a bicycle having an elongated substantially straight crosspiece, attachment means for securing said crosspiece to the front wheel stem of a bicycle and a pair of first handgrips at the ends of said crosspiece for gripping by a rider positioned in a substantially upright position; the improvement comprising:

a pair of substantially U-shaped second handgrips having a first and second leg;

clamp means securing said first leg of said second handgrips to said crosspiece, each of said pair of second handgrips positioned on opposite sides of said attachment means intermediate said attachment means and said first handgrips, said clamp means is secured to said tubular handgrip in a manner such that said second handgrips each lies in a plane and said planes are angled sufficiently to intersect a third plane orthogonally formed with an axis of said crosspiece and said third plane located between said pair of said tubular handgrips whereby the plane of said second handgrips intersect said third plane at a position outwardly of the base of the U-shaped handgrip opposite the direction from which said first and second legs extend;

said second handgrips extending forwardly of said clamp means, then downwardly below said clamp means and rearwardly in the direction of said crosspiece in a curve of sufficient size to permit grasping.

8. The bicycle handlebar adapter system according to claim 7 wherein said handgrips extend in a straight line slightly inward direction forward of the crosspiece and then downward in a slightly inward direction rearwardly.

9. The improvement according to claim 7 wherein said curved portion extends about five to eight inches beyond said clamp.

10. The improvement according to claim 9 wherein said curved portion forms a substantially circular curve with a radius of from about three to four inches.

11. In combination with a handlebar for a bicycle having a crosspiece, said handle bar including a handle bar adapter system comprising:

a first and second pair of tubular handgrips, said first pair of handgrips being at the distal ends of said crosspiece;

said second pair of handgrips fixedly attached to said crosspiece intermediate of said first pair of handgrips being substantially U-shaped and having a first and second leg; and said second pair of handgrips extending in a substantially straight line forward of said crosspiece, then curving downwardly below said crosspiece and rearwardly toward said crosspiece and said second set of hangrips are attached to said crosspiece by clamp means, said clamp means extending from said crosspiece in the direction of said first leg of said second handgrips and secured to said second set of handgrips as an extension thereof in a manner such that said second handgrips being in place on the handlebar crosspiece and each lying in a plane, a third plane orthogonally formed with an axis of said crosspiece and said third plane located between said pair of said tubular handgrips whereby the planes of said second handgrips intersect said third plane at a position outwardly of the base of the U-shaped handgrip opposite the direction from which said first and second legs extend.

12. The bicycle handlebar adapter system according to claim 11 wherein said second set of handgrips are attached to said crosspiece by clamp means, said clamp means extending from said crosspiece in the direction of said second handgrips secured to said second set of handgrips as an extension thereof.

* * * * *